May 17, 1927. Re. 16,627

W. G. BEATTY

WRINGER

Original Filed Jan. 4. 1922 2 Sheets-Sheet 1

Witnesses
Chas. G. Barnett

Inventor
William George Beatty
By Iseff & Iseff
Attorneys

May 17, 1927. Re. 16,627

W. G. BEATTY

WRINGER

Original Filed Jan. 4, 1922 2 Sheets-Sheet 2

Witnesses
Chas. A. Barnett

Inventor
William George Beatty
By. Lefft & Lefft.
Attorneys.

Reissued May 17, 1927. Re. 16,627

UNITED STATES PATENT OFFICE.

WILLIAM GEORGE BEATTY, OF FERGUS, ONTARIO, CANADA, ASSIGNOR TO HAAG BROTHERS COMPANY, A COPARTNERSHIP COMPOSED OF GEORGE A. HAAG AND ALBERT R. HAAG, OF EAST PEORIA, ILLINOIS.

WRINGER.

Original No. 1,456,529, dated May 29, 1923, Serial No. 527,025, filed January 4, 1922. Application for reissue filed April 3, 1925. Serial No. 20,573.

This invention relates to a wringer comprising a pair of compression rollers, the journals of one of which are mounted in relatively stationary bearings, and the journals of the other of which are mounted in movable bearings against which pressure is applied by springs contained in spring holding frames hinged to the wringer frame for movement into and out of the pressure applying position, releasable clamping means being employed for holding them in the pressure applying position.

In the preferred construction, the spring holding frames are provided with hinge members by which they are connected to the wringer frame and with arms releasably engaged by a movable clamp, the springs, contained in the spring holding frames being tensioned by setting screws or bolts, and exerting their pressure on pins extending through lower walls of the spring holding frames and engaging the movable bearings.

For an understanding of the invention reference is to be had to the following description and accompanying drawings in which:—

Like characters of reference refer to like parts throughout the specification and drawings.

Figure 1:
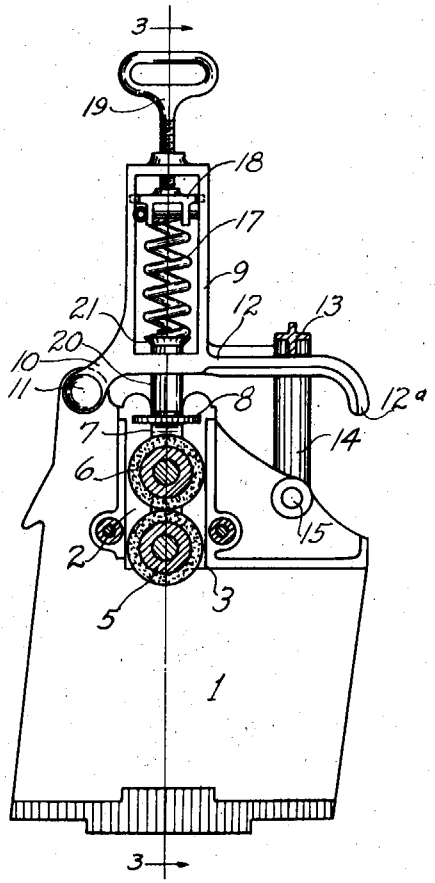
Figure 1 is a vertical sectional elevation of a wringer showing the spring holding frames and the springs in the pressure applying position.
Figure 2:
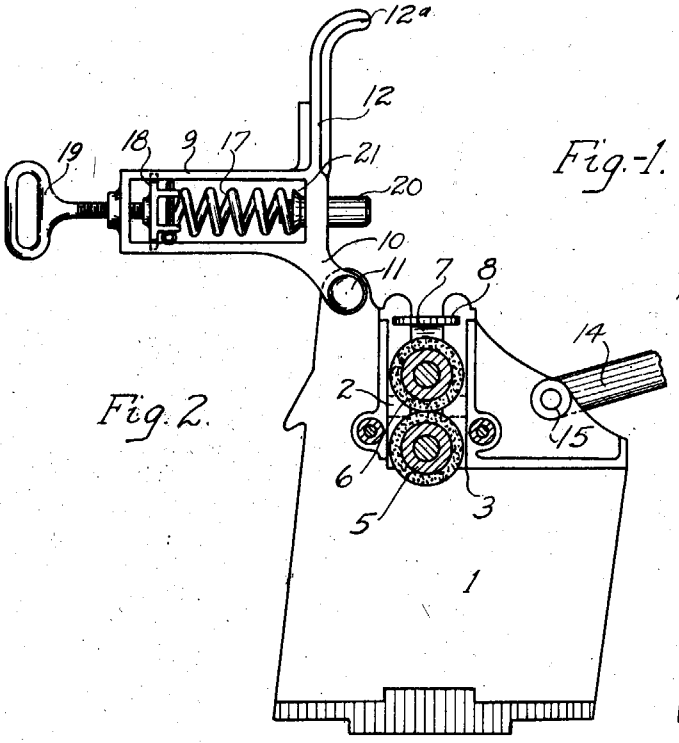
Figure 2 is a similar view to Figure 1, showing the same parts in the pressure relieving position.
Figure 3:
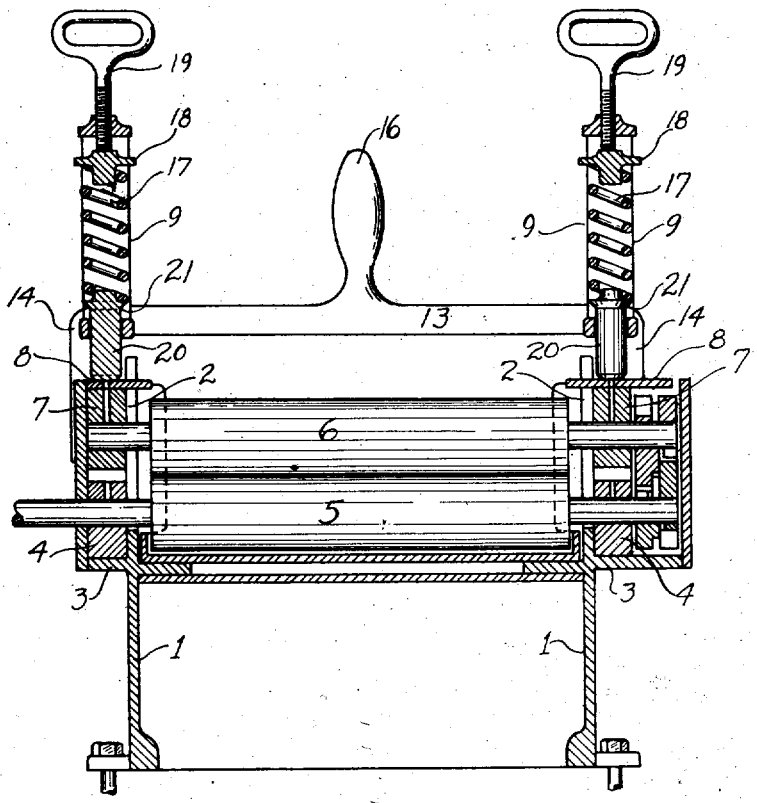
Figure 3 is a sectional elevation taken at right-angles to the preceding views, showing the parts in the same position as in Figure 1.

Those parts of the wringer, except as hereinafter described, may be of any usual or approved construction, as the pressure means are capable of use, not only with the specific type of wringer shown in the drawings, but also in connection with any other type of manual or power driven wringer apparatus, and only such parts of the wringer will be referred to as may be necessary to describe the use and general principle of the present invention.

In the general construction of the apparatus, the wringer is provided with two vertical side frames or standards 1, having vertical slideways 2 with abutments 3 at their lower ends. In the slideways 2 are relatively stationary bearing blocks 4, for the journals of the roller 5. Opposed to the roller 5 is a roller 6, the journals of which are mounted in bearing blocks 7, movable vertically in the slide-ways 2. Attached to, or forming part of the top surface of the bearing blocks 7 are wear plates 8, the edges of which are grooved to embrace the sides of the slide-ways 2 and guide the vertical movement of the bearing blocks 7 therein.

Overlying the top of the slide-ways 2 are spring holding frames 9 provided with hinge members 10 of forked construction embracing the top edges of the standards 1, and passing through the hinge members 10 and standards 1 are hinge pins 11, by which the holding frames are connected to the standards to move into or out of the pressure applying position.

The spring holding frames 9 are also provided with arms 12 engaged by the cross bar 13 of the clamp, which releasably holds the spring holding frames in the pressure applying position. The cross bar 13 of the clamp is provided with two arms 14 hinged, as shown at 15, to the standards 1, below the arms 12, and is also provided with a handle 16, by which it is moved to engage or release the arms 12. The spring holding frames 9, in the pressure applying position, extend vertically from the top of the slide-ways 2 and the hinge members 10, are arranged at one side of the spring holding frames, and the arms 12 at the other side.

Within the spring holding frames 9 are springs 17, the upper ends of which are provided with caps or wear plates 18, slidably movable in the spring holding frames, and inserted through the top of the spring holding frames are setting screws or bolts 19, by which the springs are tensioned to apply the desired pressure on the roller 6. Extending through the lower walls of the cages are pressure pins 20, formed near their upper ends with shoulders 21 which limit the downward movement of the pins 20, and prevent an excessive flattening of the rollers 5 and 6, should the clamp be left in engagement with the arms of the spring holding frames when the use of the wringer is discontinued, and bearing against the shoulders 21 are the lower ends of the springs 17.

In the pressure applying position, the spring holding frames 9, overlie the top of the slide-ways 2, with the lower ends of the pressure pins 20 engaging the wear plates 8 and the cross bar 13 of the clamp engaging the arms 12. The engagement of the clamp with the arms of the spring holding frames 9 holds them rigidly in their set position and enables the springs 17 to apply pressure to the bearing blocks 7, through the medium of the pressure pins 20, this pressure being regulated by the setting screws or bolts 19, and limited only by the shoulders 21 coming into contact with the lower walls of the spring holding frames 9.

To instantaneously release the arms 12 and relieve the pressure on the bearing blocks 7, and consequently upon the roller 6, the clamp is swung on its hinges 15, the roller 6 and bearing blocks 7, then being free, move in a direction away from the roller 5, and bearing blocks 4.

By means of the tension screws or bolts 19, the springs are continually under compression while in engagement with the pressure pins 20, and the caps or wear plates 18. To restore the pressure on the bearing blocks 7, without relieving the compression of the springs, the arms 12 have downturned or cam shaped ends 12[a] which enter beneath the cross bar 13 as it moves to the clamping position, and enables the cross bar to slide freely on the arms 12 to their limit of movement, in the clamping direction.

The foregoing construction provides a means for continually maintaining a constant compression of the springs 17, and an uniform pressure on the rollers, and it also provides an instantaneous release of the pressure when the clamp is moved to disengage the arms 12, and it also provides for the instantaneous restoration of the pressure when the clamp is again positioned to reengage the arms of the spring holding frames.

Having thus fully described my invention, what I claim as new and desire to secure by Letters Patent is:

1. A wringer including a pair of compression rollers, the journals of one of which are mounted in movable bearings, and means for applying pressure thereto hingedly connected to the wringer, comprising a pair of spring holding frames, spring pressed pins movable through the lower walls of said frames engageable with the movable bearings, and releasable means holding the pressure means in the pressure applying position.

2. A wringer comprising a pair of compression rollers, the journals of one of which are mounted in movable bearings, pressure means for the compression rollers consisting of spring holding frames hingedly connected to the wringer frame and provided with clamp engaging arms, pressure pins extending through the lower walls of the spring holding frames and engaging the movable bearings, and releasable clamping means engaging the arms and holding the pressure means in the pressure applying position.

3. A wringer including a pair of compression rollers, the journals of one of which are mounted in movable bearings against which pressure is applied, spring holding frames hinged to the wringer frame for movement into and out of the pressure applying position, springs carried by the spring holding frames and tensioned by setting screws, pins combined with the springs extending through the lower walls of the spring holding frames and exerting their pressure upon the movable bearings, arms for the spring holding frames, and a clamp hinged to the wringer frame engaging the arms and holding the pressure means in the pressure applying position.

4. A wringer including a pair of compression rollers, the journals of one of which are mounted in movable bearings, and means for applying pressure thereto hingedly connected to the wringer comprising a pair of spring holding frames, pressure pins movable through the lower walls of said frames engageable with the movable bearings, tension screws, and pressure springs maintained continually under compression by the tension screws and pressure pins.

5. A wringer including a pair of compression rollers, the journals of one of which are mounted in movable bearings, and means for applying pressure thereto hingedly connected to the wringer comprising a pair of spring holding frames, pressure pins movable through the lower walls of said frames engageable with the movable bearings, tension screws, pressure springs engaging with the tension screws and pressure pins, said pressure pins having means to limit their movement through the lower walls of said frames in the pressure applying direction, and maintain the springs in compression ready for the transference of the pressure to the wringer bearings.

6. A wringer comprising a wringer frame, a pair of rollers mounted therein, a second frame hinged to said wringer frame, pressure-applying means carried by said second frame and engaging one of said rollers, a cam member carried by said second frame, and a member pivoted to said wringer frame and releasably engaging said cam member to hold said second frame in operative position.

7. A wringer comprising a wringer frame, a pair of rollers mounted therein, a second frame hinged to said wringer frame, pressure-applying means carried by said second frame and normally engaging one of said rollers, a cam member carried by said second frame, and a member pivoted to said wringer frame and adapted to frictionally engage said cam member to hold said second frame in operative position, said pivoted member being releasable from said cam member by outward movement thereof.

8. A wringer comprising a wringer frame, a pair of rollers mounted therein, movable bearings for one of said rollers, a second frame hinged to said wringer frame, a pair of pins yieldingly mounted in said second frame and engaging said bearings, and quick-release means including a cam member fixed to said second frame and a member pivoted to said wringer frame and frictionally engaging said cam member.

In testimony whereof I affix my signature.

WILLIAM GEORGE BEATTY.